(12) United States Patent
Kim et al.

(10) Patent No.: US 8,279,385 B2
(45) Date of Patent: Oct. 2, 2012

(54) LIQUID CRYSTAL DISPLAY

(75) Inventors: Yoon-Jang Kim, Suwon-si (KR);
Byoung-Sun Na, Hwaseong-si (KR);
In-Ho Park, Cheonan-si (KR);
Kee-Bum Park, Cheonan-si (KR);
Yun-Jung Cho, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 358 days.

(21) Appl. No.: 12/723,384

(22) Filed: Mar. 12, 2010

(65) Prior Publication Data

US 2011/0063557 A1 Mar. 17, 2011

(30) Foreign Application Priority Data

Sep. 16, 2009 (KR) .................. 10-2009-0087743

(51) Int. Cl.
*G02F 1/1337* (2006.01)
(52) U.S. Cl. ........................................ 349/129
(58) Field of Classification Search ............ 349/129
See application file for complete search history.

(56) References Cited

U.S. PATENT DOCUMENTS

| | | | |
|---|---|---|---|
| 2003/0071952 A1 | 4/2003 | Yoshida et al. | |
| 2007/0291207 A1 | 12/2007 | Nakanishi et al. | |
| 2009/0002588 A1* | 1/2009 | Lee et al. ................. | 349/42 |
| 2009/0086144 A1 | 4/2009 | Chen et al. | |

FOREIGN PATENT DOCUMENTS

| | | |
|---|---|---|
| JP | 2006-330638 | 7/2006 |
| JP | 2007-256989 | 10/2007 |
| JP | 2008-097049 | 4/2008 |
| KR | 2004-0016404 | 2/2004 |
| KR | 2006-0099635 | 9/2006 |
| KR | 2007-0103543 | 10/2007 |
| KR | 2008-0114353 | 12/2008 |
| KR | 2009-0017228 | 2/2009 |
| KR | 2009-0042167 | 4/2009 |

* cited by examiner

*Primary Examiner* — Phu Vu

(74) *Attorney, Agent, or Firm* — H. C. Park & Associates, PLC

(57) ABSTRACT

The present invention relates to a liquid crystal display. A liquid crystal display according to exemplary embodiments of the present invention includes a substrate, and a pixel electrode formed on the substrate and including a plurality of minute branches. The pixel electrode includes a first region and a second region where a first distance and a second distance are provided according to an interval between the respective neighboring minute branches, wherein the second distance that is larger than the first distance, and a third region is provided between the first region and the second region, and the position of the third region having an interval between the neighboring minute branches is gradually changed.

32 Claims, 11 Drawing Sheets

LIQUID CRYSTAL DISPLAY

CROSS-REFERENCE TO RELATED APPLICATION

This application claims priority to and the benefit of the Korean Application No. 10-2009-0087743, filed on Sep. 16, 2009, which is hereby incorporated by reference for all purposes as if fully set forth herein.

BACKGROUND OF THE INVENTION

1. Field of the Invention

Exemplary embodiments of the present invention relate to a liquid crystal display.

2. Description of the Background

As one of widely used flat panel displays, a liquid crystal display (LCD) includes two display panels provided with field generating electrodes such as pixel electrodes and a common electrode, and a liquid crystal layer interposed therebetween. The LCD display can present images by applying voltages to the field-generating electrodes to generate an electric field in the liquid crystal (LC) layer that determines the orientation of LC molecules therein to adjust polarization of incident light.

A vertical alignment (VA) mode LCD, which aligns LC molecules such that their long axes are perpendicular to the panels in the absence of an electric field, is recognized because of its high contrast ratio and wide reference viewing angle.

In the vertical alignment (VA) mode liquid crystal display, to obtain the wide viewing angle, a plurality of domains in which the alignment directions of the liquid crystal molecules are different may be formed in one pixel.

Various methods have been proposed in which an approach discloses a minute slit or a cutout formed in the field generating electrodes or a protrusion that is formed on the field generating electrodes to form the plurality of domains in one pixel. In this approach, the plurality of domains may be formed in alignment with the liquid crystal molecules in vertical direction with respect to a fringe field generated between the edges of the cutout or the protrusion and the field generating electrodes facing the edges.

However, a typical liquid crystal display using the vertical alignment (VA) mode has poor side visibility compared with front visibility such that one pixel is divided into two subpixels and extra voltages are required to supply the subpixels to solve the poor side visibility.

SUMMARY OF THE INVENTION

These and other needs are addressed by the present invention, in which exemplary embodiments of the present invention provide enhancing visibility of a liquid crystal display including a field generating electrode of a plurality of minute slits to reduce display deterioration factor such as texture.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a liquid crystal display and method for manufacturing the liquid crystal display. The liquid crystal display comprises a substrate and a pixel electrode, comprising a plurality of minute branches, formed on the substrate. The pixel electrode comprises a first region and a second region where a first distance and a second distance are provided according to an interval formed between the respective neighboring minute branches. The second distance is larger than the first distance, and a third region is positioned between the first region and the second region, and the position of the third region having an interval between the neighboring minute branches is gradually changed.

It is to be understood that both the foregoing general description and the following detailed description are exemplary and explanatory and are intended to provide further explanation of the invention as claimed.

DETAILED DESCRIPTION OF ILLUSTRATED EMBODIMENTS

An apparatus, method, and software for manufacturing a liquid crystal display (LCD) capable of enhancing visibility of a liquid crystal display are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

It is noted that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described with reference to FIG. 1 and FIG. 2.

Figure 1:
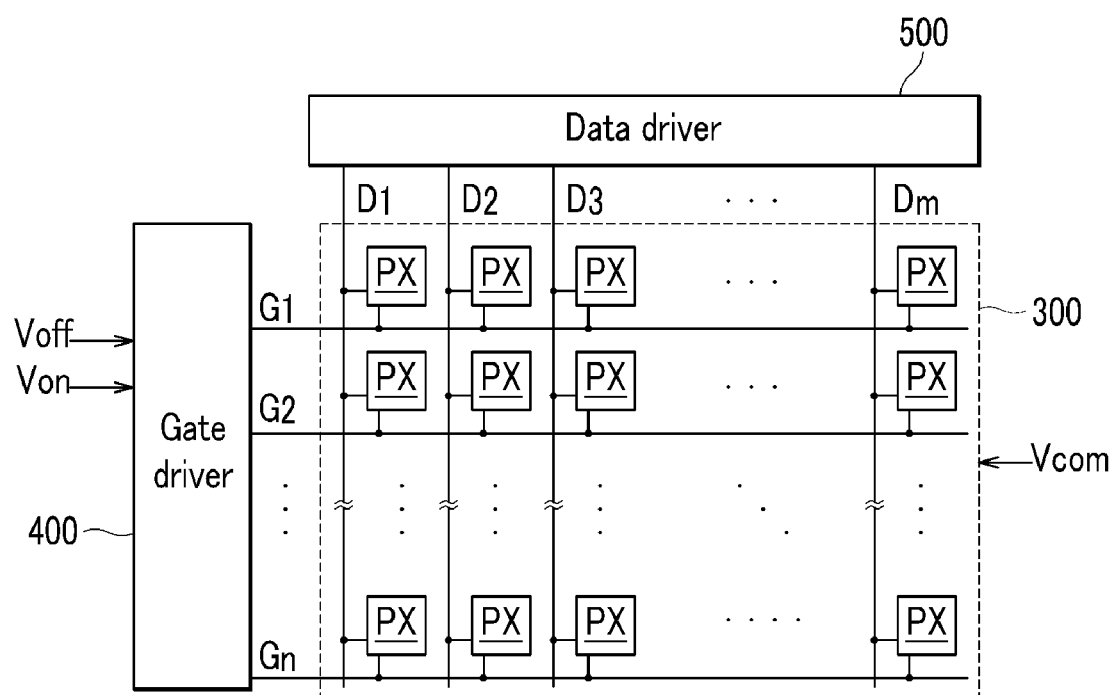
FIG. 1 is a block diagram of a liquid crystal display, according to exemplary embodiments of the present invention.
Figure 2:
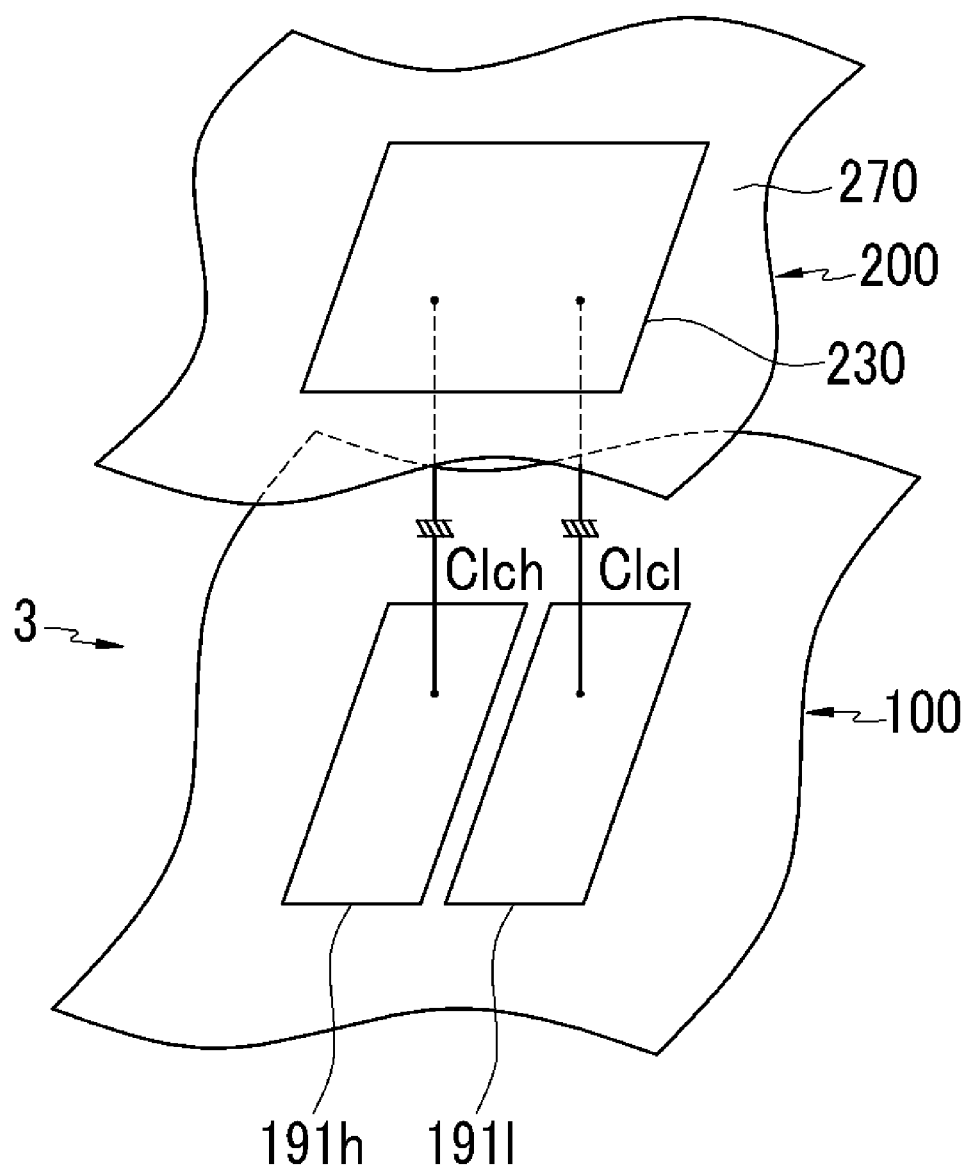
FIG. 2 is a circuit diagram illustrating exemplary two subpixels and a structure of a liquid crystal display, according to exemplary embodiments of the present invention.

FIG. 1 is a block diagram of a liquid crystal display according to exemplary embodiments of the present invention, and FIG. 2 is a circuit diagram illustrating exemplary two subpixels and a structure of a liquid crystal display, according to exemplary embodiments of the present invention.

Referring to FIG. 1, a liquid crystal display may include a liquid crystal panel assembly 300, a gate driver 400, and a data driver 500.

According to a circuit of the liquid crystal panel assembly 300, the liquid crystal panel assembly 300 may include a plurality of signal lines G1-Gn and D1-Dm, and a plurality of pixels PX arranged in a substantial matrix format. In the structure shown in FIG. 2, the liquid crystal panel assembly 300 may include a lower panel 100 and an upper panel 200 facing to each other and a liquid crystal layer 3 interposed therebetween.

The signal lines G1-Gn and D1-Dm that are provided in the lower panel 100 include a plurality of gate lines G1 to Gn to transmit gate signals (referred as "scanning signals") and a plurality of data lines D1 to Dm to transmit a data voltage. The gate lines G1 to Gn can be arranged in parallel and extend approximately in a row direction, and the data lines D1 to Dm can be arranged in parallel to each other and extend approximately in a column direction.

For example, each pixel PX connected to the i-th (i=1, 2, . . . , n) gate line $G_i$) and the j-th (j=1, 2, . . . , m) data line $D_j$) may include a pair of subpixels, and each subpixel may include liquid crystal capacitors Clch and Clcl. Two subpixels may further include a switching element (not shown) connected to the gate lines $G_1$-$G_n$, the data lines $D_1$-$D_m$, and the liquid crystal capacitors Clch and Clcl.

The liquid crystal capacitor Clch/Clcl may include a first/second subpixel electrode 191$h$/191$l$ of the lower panel 100 and a common electrode 270 of the upper panel 200 and the upper panel and lower panel can be provided as two terminals. The liquid crystal layer 3 between the two terminals serves as a dielectric material. The pair of subpixel electrodes 191$h$ and 191$l$ can be separated from each other and can form one pixel electrode 191. The common electrode 270 can be formed to the whole surface of the upper panel 200 and can be applied with the common voltage Vcom. The liquid crystal layer 3 has negative dielectric anisotropy, and liquid crystal molecules of the liquid crystal layer 3 may be aligned such that their major axes may substantially perpendicular to the surfaces of the two display panels when an electric field is not applied. Differently from the illustration in FIG. 2, the common electrode 270 may be formed on the lower panel 100, and at least one of the two electrodes 191 or 270 may have a linear shape or a bar shape.

For example, for color display, each pixel PX uniquely can display one of three primary colors (spatial division) or each pixel PX alternately can display the three primary colors (temporal division) as time passes, and a desired color can be recognized by a spatial or temporal sum of the primary colors. For example, the primary colors can be three primary colors of red, green, and blue. FIG. 2 shows a color filter 230 displaying one of primary colors on a region of the upper panel 200 by each of the pixels as an example of spatial division. In some example, unlike the case of FIG. 2, the color filter 230 may be provided on or under the subpixel electrodes 191$h$ and 191$l$ of the lower panel 100.

Polarizers (not shown) may be provided on the outer surface of the display panels 100 and 200, and polarization axis of the two polarizers may be crossed.

Referring again to FIG. 1, the data driver 500 can be connected to the data lines D1-Dm of the liquid crystal panel assembly 300, and can apply the data voltage to the data lines D1-Dm.

The gate driver 400 can be connected to the gate line G1 to Gn of the liquid crystal panel assembly 300, and can apply gate signals obtained by combining a gate-on voltage Von to turn on a switching element and a gate-off voltage Voff to turn off the switching element to the gate lines G1 to Gn.

Next, one example of the liquid crystal panel assembly will be described with reference to FIG. 3, FIG. 4 and FIG. 5.

Figure 3:
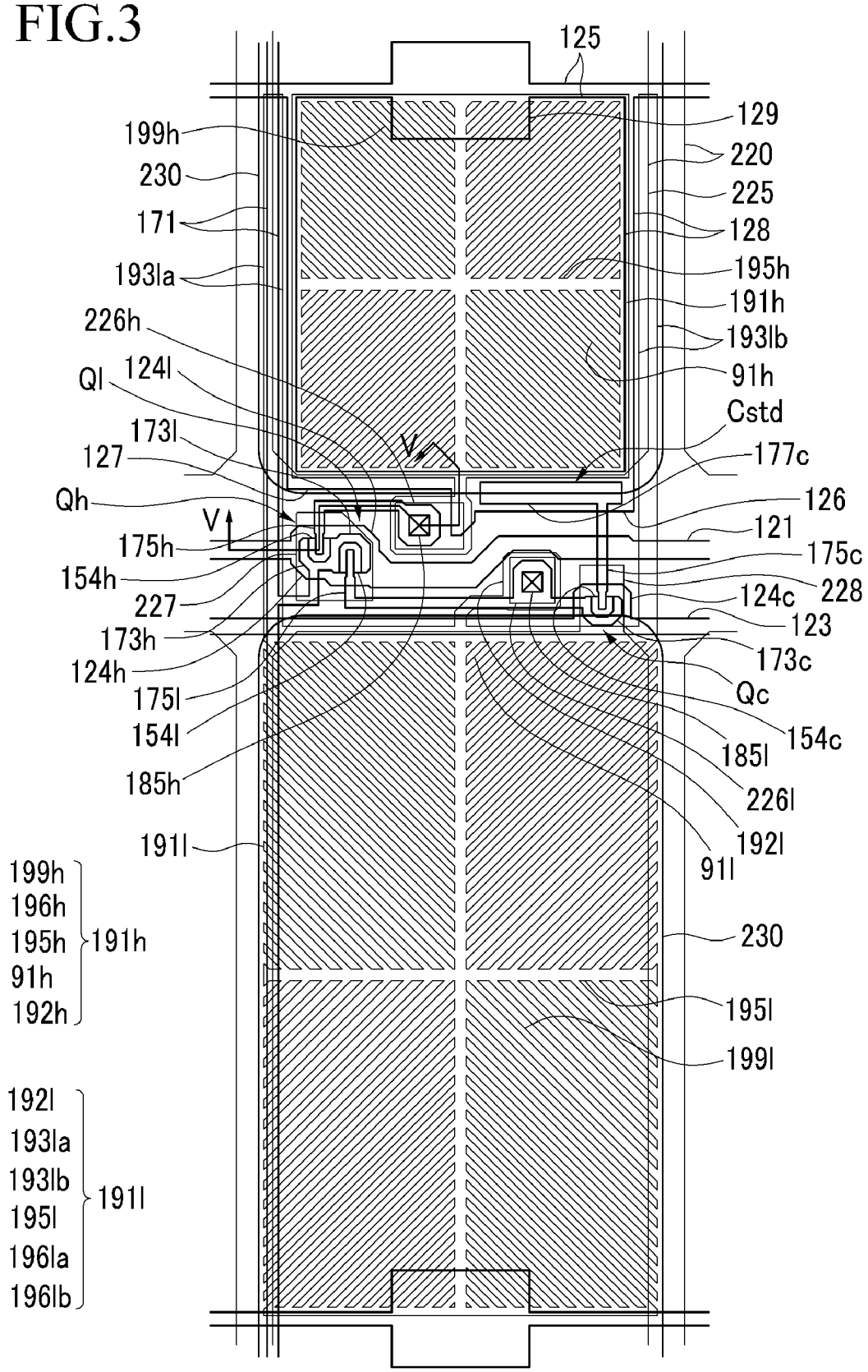
FIG. 3 is a layout view of a liquid crystal panel assembly, according to exemplary embodiments of the present invention.
Figure 4:
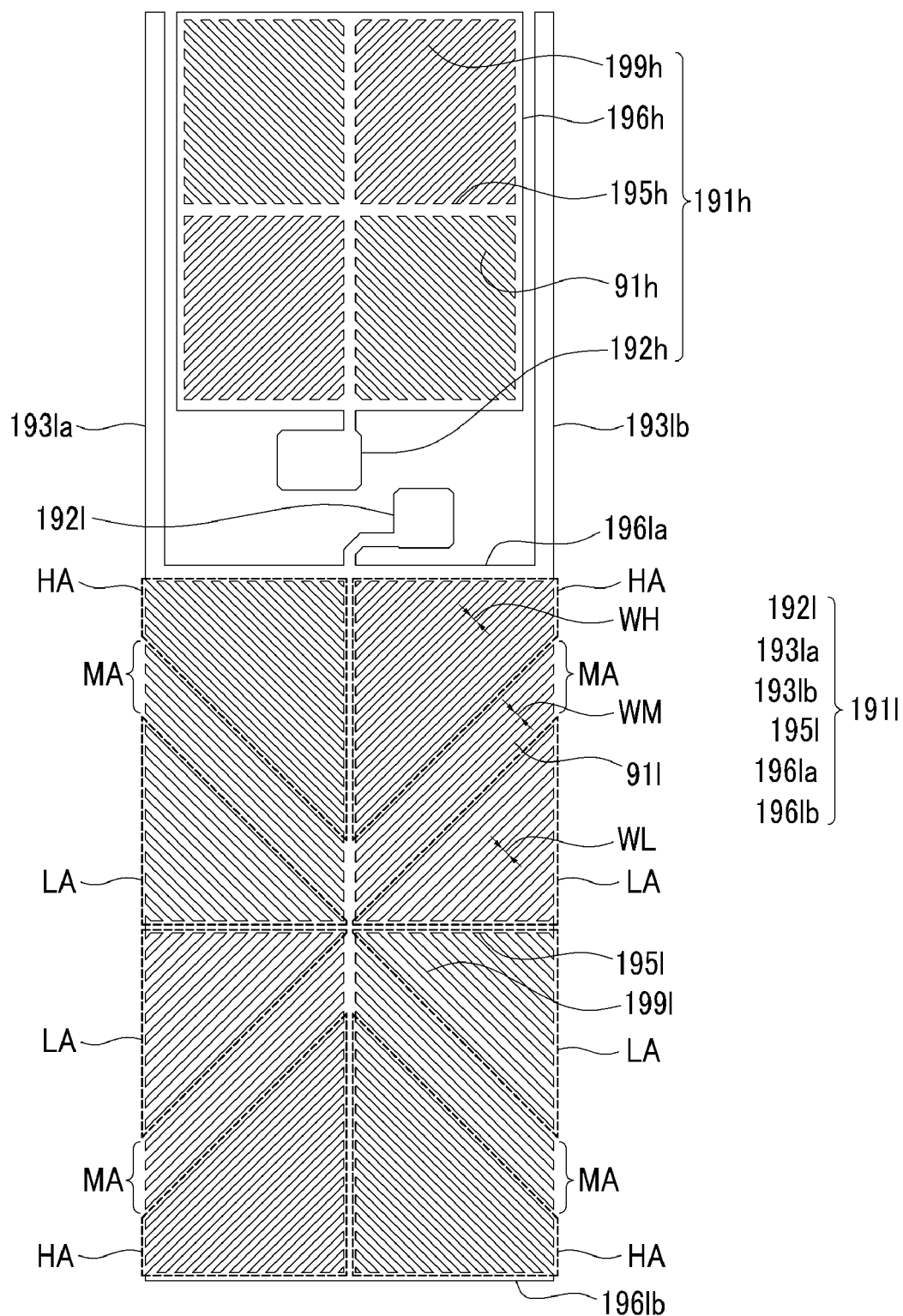
FIG. 4 is a top plan view of a pixel electrode of a liquid crystal panel assembly of FIG. 3.
Figure 5:
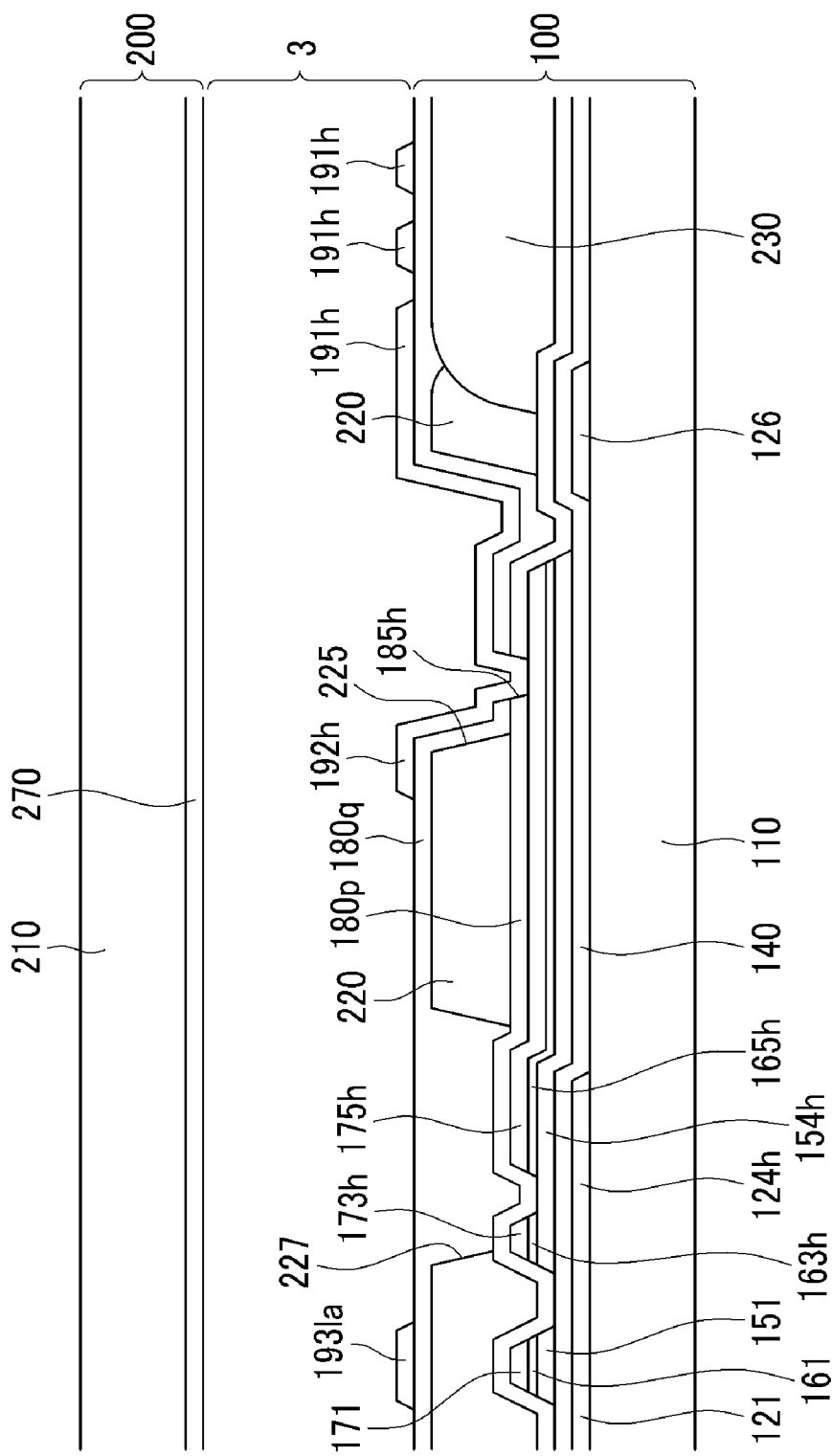
FIG. 5 is a cross-sectional view of the liquid crystal panel assembly of FIG. 3 taken along the line V-V.

FIG. 3 is a layout view of a liquid crystal panel assembly according to exemplary is embodiments of the present invention, FIG. 4 is a top plan view of a pixel electrode of a liquid crystal panel assembly of FIG. 3, and FIG. 5 is a cross-sectional view of the liquid crystal panel assembly of FIG. 3 taken along the line V-V.

A liquid crystal panel assembly according to exemplary embodiments of the present invention includes the lower panel 100 and the upper panel 200 facing each other, and the liquid crystal layer 3 interposed therebetween. Polarizers (not shown) may be provided on the outer surface of the display panels 100 and 200.

Next, the upper panel 200 will be described.

A common electrode 270 can be formed on an insulation substrate 210. The common electrode 270 may be made of a transparent conductor or metal such as ITO and IZO. An alignment layer (not shown) may be formed on the common electrode 270.

The liquid crystal layer 3 between the lower panel 100 and the upper panel 200 may include liquid crystal molecules having negative dielectric anisotropy, and may be oriented such that the major axes of the liquid crystal molecules of the liquid crystal layer 3 are substantially perpendicular to the surfaces of the two display panels 100 and 200 when no electric field is applied.

Now, the lower panel 100 will be described.

A plurality of gate conductors including a plurality of gate lines 121, a plurality of down gate lines 123, and a plurality of storage electrode lines 125 can be formed on an insulation substrate 110.

The gate lines 121 and the down gate lines 123 can transfer gate signals and substantially extend in a horizontal direction. Each gate line 121 may include a first gate electrode 124$h$ and a second gate electrode 124$l$ protruding upward and downward, and each down gate line 123 may include a third gate electrode 124$c$ protruding upward. The first gate electrode 124$h$ and the second gate electrode 124$l$ can be connected to each other thereby forming a single protrusion.

The storage electrode lines 125 can substantially be extended in the horizontal direction and may transfer a predetermined voltage such as a common voltage Vcom. The storage electrode line 125 may include a storage electrode 129 protruding upward and downward, a pair of longitudinal portions 128 extending substantially vertical to the gate line 121 downward, and a transverse portion 127 connecting each ends of the pair of longitudinal portions 128 to each other. The transverse portion 127 may include a storage expansion 126 extended downward.

A gate insulating layer 140 can be formed on the gate conductor 121, 123, and 125.

A plurality of semiconductor stripes 151 made of such as hydrogenated amorphous silicon (a-Si) or polysilicon can be formed over the gate insulating layer 140. The semiconductor stripes 151 can substantially be extended in the vertical direction, and each semiconductor stripe 151 may include a first and a second semiconductors 154*h* and 154*l* extending toward the first and the second gate electrodes 124*h* and 124*l* and connected to each other, and a third semiconductor 154*c* can be connected to the second semiconductor 154*l*.

A plurality of ohmic contact stripes 161 can be formed on the semiconductor stripes 151 in which first ohmic contacts 163*h* and 165*h* can be formed on the first semiconductor 154*h*, and a second ohmic contact (not shown) and a third ohmic contact (not shown) can also be formed on the second semiconductor 154*l* and the third semiconductor 154*c*. It is noted that the first ohmic contact 165*h* may be protruded from the ohmic contact stripe 161.

A data conductor including a plurality of data lines 171, a plurality of first drain electrodes 175*h*, a plurality of second drain electrodes 175*l*, and a plurality of third drain electrodes 175*c* can be formed on the ohmic contacts 161 and 165*h*.

The data lines 171 can transmit data signals and are provided extending in the longitudinal direction thereby intersecting the gate lines 121 and the down gate lines 123. Each data line 171 may include a first source electrode 173*h* and a second source electrode 173*l* forming a 'W' shape together and extending toward the first gate electrode 124*h* and the second gate electrode 124*l*.

The first drain electrode 175*h*, the second drain electrode 175*l*, and the third drain electrode 175*c* may have one end portion having a wide area and the other end portion of a linear shape. The bar end portions of the first drain electrode 175*h* and the second drain electrode 175*l* may partially be enclosed by the first source electrode 173*h* and the second source electrode 173*l*. The wide end portion of the second drain electrode 175*l* is extending thereby to form the third source electrode 173*c* as a "U" shape. A wide end portion 177*c* of the third drain electrode 175*c* may overlap the storage expansion 126 thereby forming a down capacitor Cstd, and the bar end portion may partially be enclosed by the third source electrode 173*c*.

The first/second/third gate electrode 124*h*/124*l*/124*c*, the first/second/third source electrode 173*h*/173*l*/173*c*, and the first/second/third drain electrode 175*h*/175*l*/175*c* may form the first/second/third thin film transistor (TFT) Qh/Ql/Qc along with the first/second/third semiconductor island 154*h*/154*l*/154*c*, and a channel of the thin film transistor may respectively be formed in the semiconductor 154*h*/154*l*/154*c* between the source electrode 173*h*/173*l*/173*c* and the drain electrode 175*h*/175*l*/175*c*.

Also, the semiconductor stripes 151 including the semiconductors 154*h*, 154*l*, and 154*c* except for the channel region between the source electrodes 173*h*, 173*l*, and 173*c*, and the drain electrodes 175*h*, 175*l*, and 175*c* may have substantially similar shape as the data conductors 171, 175*h*, 175*l*, and 175*c*, and the underlying ohmic contacts 161 and 165*h*. That is, the semiconductor stripes 151 including the semiconductors 154*h*, 154*l*, and 154*c* may have a portion that can be exposed without being covered by the data conductors 171, 175*h*, 175*l*, and 175*c*, and a portion between the source electrodes 173*h*, 173*l*, and 173*c* and the drain electrodes 175*h*, 175*l*, and 175*c*.

A lower passivation layer 180*p* made of an inorganic insulator such as silicon nitride or silicon oxide can be formed on the data conductors 171, 175*h*, 175*l*, 175*c* through which the semiconductors 154*h*, 154*l*, and 154*c* can be exposed.

A color filter 230 can be formed on the lower passivation layer 180*p*. In some examples, the color filter 230 can be formed in most of the region except for the region of the first thin film transistor (Qh), the second thin film transistor (Ql), and the third thin film transistor (Qc). Also, each color filter 230 may be formed along in the space of the longitudinal direction between the neighboring data lines 171. Each color filter 230 may display one of primary colors such as three primary colors, for example, red, green, and blue.

A light blocking member 220 can be formed to the region at which the color filter 230 does not occupy or the portion of the color filter 230. The light blocking member 220 may be referred to as a black matrix and prevents light leakage. The light blocking member 220 may include a portion covering a region at which the first thin film transistor Qh, the second thin film transistor Ql, and the third thin film transistor Qc can be disposed along with an extending portion according to the data line 171. The light blocking member 220 may include an opening 227 disposed on the first thin film transistor Qh and the second thin film transistor Ql, an opening 226*h* disposed on the wide end portion of the first drain electrode 175*h*, an opening 226*l* disposed on the wide end portion of the second drain electrode 175*l*, and an opening 228 disposed on the third thin film transistor Qc. Deterioration inspections of the elements such as the thin film transistors may be performed during a manufacturing process of a liquid crystal display through the openings 226*h*, 226*l*, 227, and 228 from which the light blocking member 220 can be removed.

An upper passivation layer 180*q* can be formed on the light blocking member 220 and the color filter 230.

The lower passivation layer 180*p* and the upper passivation layer 180*q* have a plurality of contact holes 185*h* and 185*l* respectively exposing to the wide end portion of the first drain electrode 175*h* and the wide end portion of the second drain electrode 175*l*. The contact holes 185*h* and 185*l* can be disposed within the openings 226*h* and 226*l* of the light blocking member 220.

A pixel electrode including the first subpixel electrode 191*h* and the second subpixel electrode 191*l* can be formed on the upper passivation layer 180*q*.

The first and second subpixel electrodes 191*h* and 191*l* are adjacent each other in the column direction. The height of the second subpixel electrode 191*l* may be higher than the height of the first subpixel electrode 191*h*, and the height of the second subpixel electrode 191*l* may be about one to three times higher than that of the first subpixel electrode 191*h*.

The entire shape of the first subpixel electrode 191*h* can be a quadrangle, and may include a cross stem 195*h* including a transverse stem and a longitudinal stem, an outer stem 196*h* enclosing the cross stem 195 along the outer boundary, and a protrusion 192*h* protruding downward from the longitudinal stem of the cross stem 195*h*.

The entire shape of the second subpixel electrode 191*l* may also a quadrangle, and may include a cross stem 195*l* including a transverse stem and a longitudinal stem, an upper transverse portion 196*la*, a lower transverse portion 196*lb*, and a protrusion 192*l* protruding upward from the upper portion of the longitudinal stem of the cross stem 195*l* and right and left longitudinal portions 193*la* and 193*lb* disposed on the right and left sides of the first subpixel electrode 191*h*. The right and left longitudinal portions 193*la* and 193*lb* may prevent capacitive coupling between the data line 171 and the first subpixel electrode 191*h*.

The first subpixel electrode 191*h* can be divided into four subregions by the cross stem 195*h*, and the second subpixel electrode 191*l* can be divided into four subregions by the cross stem 195*l*. Each subregion may include a plurality of minute branch electrodes 199h and 199l obliquely extending outside from the cross stems 195h and 195l, and minute slits 91h and 91l can be disposed between the neighboring minute branches 199h and 199l. The minute branches 199h and 199l or the minute slits 91h and 91l may form an angle of about 45 or 135 degrees based on the gate line 121. The minute branches 199h and 199l or the minute slits 91h and 91l of two neighboring subregions may be formed substantially in a right angle with each other.

Referring to FIG. 4, each subregion of the second subpixel electrode 191l may include a first region HA where the interval between the minute branches 199l or the width WH of the minute slits 91l is relatively narrow, a second region LA where the interval between the minute branches 199l or the width WL of the minute slits 91l is relatively wide, and a third region MA where the interval between the minute branches 199l or the width WM of the minute slits 91l can gradually be changed. Accordingly, the pitch of the minute branches 199l or the minute slits 91l in the third region MA can be increased as approaching to the second region LA from the first region HA. In the first region HA, the second region LA, and the third region MA, the width of the minute branches 199l or the interval between the minute slits 91l may be uniform. For example, the interval between neighboring minute branches 199l or the interval between neighboring minute slits 91l may be in the range of about 3.5-4.5 μm, more preferably about 4 μm.

In each subregion of the second subpixel electrode 191l, the area of the first region HA may larger than that of the second region LA. Particularly, when the first region HA occupies about 60-70% of the entire area of each subregion, the transmittance of the liquid crystal display may be highly improved. More particularly, when the first region HA occupies about 61.5% of the entire area of each subregion, the best visibility and transmittance may be achieved.

The third region MA may occupy about 15-25% of the entire area of each subregion.

In the first region HA, the interval between the minute branches 199l or the width WH of the minute slits 91l may be in the range of about 2.5-3.5 μm, more preferably, about 3 μm, and the pitch of the minute branches 199l or the minute slits 91l may be in the range of about 5-7 μm, more particularly, about 6 μm. In the second region LA, the interval between the minute branches 199l or the width WL of the minute slits 91l may be in the range of about 3.5-5.5 μm, more preferably, about 4-5 μm, and the pitch of the minute branches 199l or the minute slits 91l may be in the range of about 6-9 μm, more particularly, about 7-8 μm. Also, in the third region MA, the interval between the minute branches 199l or the width WM of the minute slits 91l may be gradually changed by about 0.2-0.3 μm, more preferably, by about 0.25 μm. The provided values are exemplary, and one of ordinary skill in the art may recognize the values can be changed according to the design elements such as a cell gap and kind and characteristics of the liquid crystal layer 3.

The protrusion 192h of the first subpixel electrode 191h may receive the data voltage from the first drain electrode 175h via the first contact hole 185h, and the protrusion 192l of the second subpixel electrode 191l may receive the data voltage from the second drain electrode 175l via the second contact hole 185l. In this example, the data voltage applied to the second subpixel electrode 191l may be less than the data voltage applied to the first subpixel electrode 191h.

An alignment layer (not shown) may be formed on the first and second subpixel electrodes 191h and 191l, and the upper passivation layer 180q.

The first and second subpixel electrodes 191h and 191l applied by the data voltage may form the electric field along with the common electrode 270 of the upper panel 200 such that the electric field may determine the direction of the liquid crystal molecules in the liquid crystal layer 3 between two electrodes 191 and 270. The change degree of the polarization of the light that is incident to the liquid crystal layer 3 can be changed according to the inclination degree of the liquid crystal molecules, and the change of the polarization may correspond to a change of the transmittance by the polarizer, thereby displaying images of the liquid crystal display.

In some examples, the edges of the minute branches 199h and 199l or the minute slits 91h and 91l included in the first and second subpixel electrodes 191h and 191l may distort the electric field to make the horizontal components perpendicular to the edges of the minute branches 199h and 199l or the minute slits 91h and 91l, and the inclination direction of the liquid crystal molecules 31 can be determined according to the direction determined by the horizontal components. Accordingly, the liquid crystal molecules 310 firstly may tend to tilt in the direction perpendicular to the edges of the minute branches 199h and 199l or the minute slits 91h and 91l. However, since the directions of the horizontal components of the electric field can be affected by neighboring minute branches 199h and 199l or minute slits 91h and 91l that are opposite to each other, and the widths of the minute branches 199h and 199l or the minute slits 91h and 91l are narrow, the liquid crystal molecules tend to arrange in opposite directions to each other that are tilted in the direction parallel to the length direction in which the minute branches 199h and 199l or minute slits 91h and 91l can be extended.

Also, in exemplary embodiments of the present invention, the first and second subpixel electrodes 191h and 191l may include four subregions where the length directions in which extension of the minute branches 199h and 199l or the minute slits 91h and 91l is different from each other such that the inclined directions of the liquid crystal molecules of the liquid crystal layer 3 can be all four directions. Therefore, the viewing angle of the liquid crystal display can be widened by varying the inclined directions of the liquid crystal molecules.

The first subpixel electrode 191h and the common electrode 270 may form the first liquid crystal capacitor Clch along with the liquid crystal layer 3 interposed therebetween, and the second subpixel electrode 191l and the common electrode 270 may form the second liquid crystal capacitor Clcl along with the liquid crystal layer 3 interposed therebetween thereby maintaining the voltage after the first and second thin film transistors Qh and Ql can be turned off.

The first and second subpixel electrodes 191h and 191l may overlap the storage electrode line 125 as well as the storage electrode 129 thereby forming the first and second storage capacitors Csth and Cstl, and the first and second storage capacitors Csth and Cstl to enhance the voltage storage capacity of the first and second liquid crystal capacitors Clch and Clcl.

In some examples, the voltage of the first subpixel electrode 191h and the second subpixel electrode 191l may be changed, as according to the above described process, if the voltages of the first and second subpixel electrodes 191h and 191l can be different, the voltages applied to the first and second liquid crystal capacitors Clch and Clcl can be different such that the luminance thereof also can be different. Accordingly, if the voltages of the first and second liquid crystal capacitors Clca and Clcb can appropriately be controlled it is contemplated that the lateral visibility can be improved. The operation by which the voltages of the first subpixel electrode 191h and the second subpixel electrode 191l can be changed will be described later.

In some examples, each subregion of the second subpixel electrode 191l may include a region where the interval between the minute branches 199l or the width of the minute slits 91l may wide and a region where the interval between the minute branches 199l or the width of the minute slits 91l may narrow. The intensity of the electric field in the liquid crystal layer 3 can be increased as the interval between the minute branches 199l or the width of the minute slits 91l is narrower, such that at least two region having different inclination degrees of the liquid crystal molecules can be generated in the second liquid crystal capacitor Clcl, and the luminance thereof can be changed according to the regions. Accordingly, the lateral visibility may further be improved.

In some examples, when two regions HA and LA where the pitch of the minute branches 199l or the minute slits 91l are different from each other in each subregion of the second subpixel electrode 191l that are adjacent to each other, texture may be generated at the boundary therebetween. However it is recognized that the third region MA where the pitch of the minute branches or the minute slits can gradually be changed that can be disposed between two regions HA and LA where the pitch of the minute branches 199l or the minute slits 91l may different, such that the arrangement of the liquid crystal molecules may be controlled, and transmittance may be improved by minimizing the texture.

In some examples, the second subpixel electrode 191l may include the region LA having a relatively larger pitch of the minute branches 199l or the minute slits 91l, the region HA having a relatively small pitch of the minute branches or the minute slits, and the region MA between the region LA and the region HA where the pitch of the minute branches or the minute slits can be gradually changed. However it is contemplated that the present invention may be applied for visibility improvement and texture reduction process that the pixel electrode of one pixel PX may not divided into two subpixel electrodes, but may consist in one body. In this example, the pixel electrode may have the same structure as the first subpixel electrode 191h or the second subpixel electrode 191l as shown in FIG. 4, and a data voltage from a data line may be transmitted through one thin film transistor.

In some examples, one subpixel electrode may include at least two regions where the pitch of the minute branches or the pitch of the minute slits may different. Even in this example, it is noted that a middle region where the pitch of the minute branches or the pitch of the minute slits can gradually be changed and the pitch may further be disposed between two neighboring regions where the pitch of the minute branches or the pitch of the minute slits may different.

By way of example, a spacer (not shown) may be provided to maintain a gap between the lower panel 100 and the upper panel 200, referred to as a cell gap, may be further formed on the lower panel 100.

Next, the circuit structure and the operation of the liquid crystal display according to exemplary embodiments of the present invention will be described with reference to FIG. 6 along with the above-described FIG. 1, FIG. 2, FIG. 3, FIG. 4 and FIG. 5.

Figure 6:
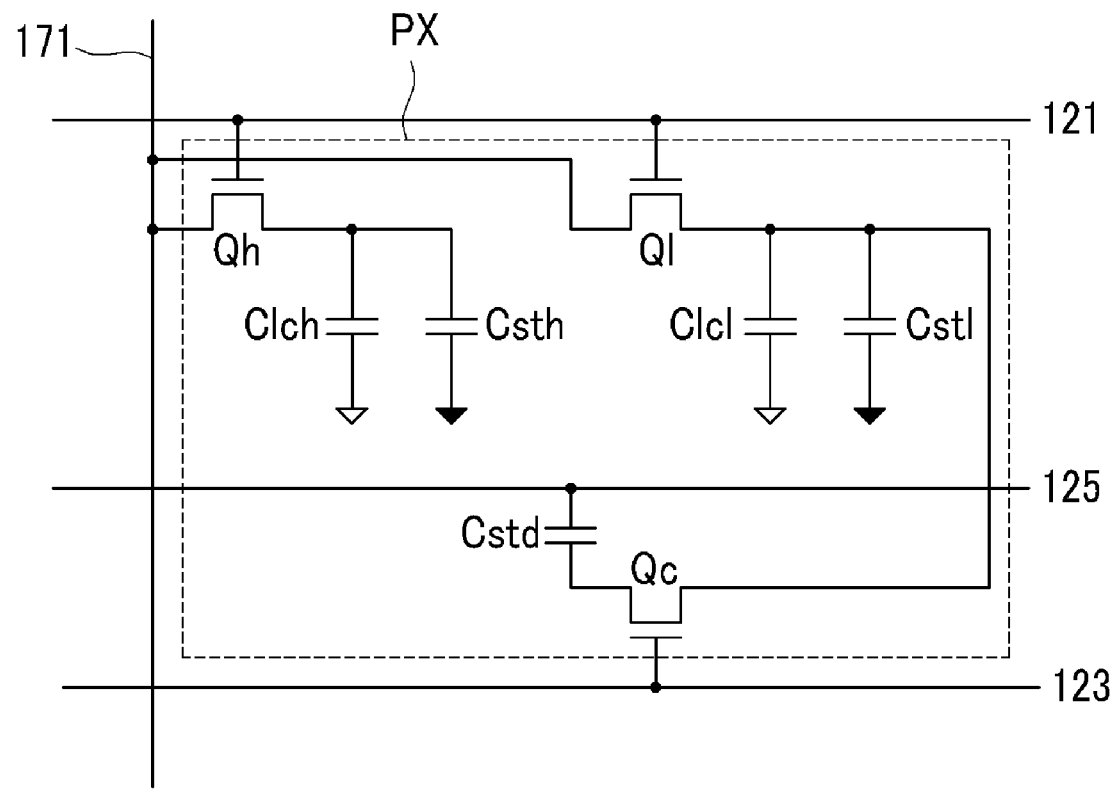
FIG. 6 is a circuit diagram of a pixel of a liquid crystal display, according to exemplary embodiments of the present invention.

FIG. 6 is a circuit diagram of a pixel of a liquid crystal display, according to exemplary embodiments of the present invention.

Referring to FIG. 6, a liquid crystal display shown in FIG. 1, FIG. 2, FIG. 3, FIG. 4 and FIG. 5 may include signal lines including a gate line 121, a storage electrode line 125, a down gate line 123, a data line 171, and a pixel PX connected to the signal lines.

The pixel PX may include the first, second, and third thin film transistors Qh, Ql, and Qc, the first and second liquid crystal capacitors Clch and Clcl, the first and second storage capacitors Csth and Cstl, and a down capacitor Cstd. For example, for purpose of the illustration, the first switching element Qh and the first thin film transistor Qh, the second switching element Ql and the second thin film transistor Ql, and the third switching element Qc and the third thin film transistor Qc can be denoted by the same reference numerals, respectively.

The first and second thin film transistors Qh and Ql can be connected to the gate line 121 and the data line 171, and the third thin film transistor Qc can be connected to the down gate line 123.

The first and second thin film transistors Qh and Ql, being as three terminal elements, provided in the lower panel 100 may have a control terminal connected to the gate line 121, an input terminal connected to the data line 171, and an output terminal connected to the first and second liquid crystal capacitors Clch and Clcl, and the first and second storage capacitors Csth and Cstl.

The third thin film transistor Qc, being as a three terminal element, provided in is the lower panel 100 may have a control terminal connected to the down gate line 123, an input terminal connected to the second liquid crystal capacitor Clcl, and an output terminal connected to the down capacitor Cstd.

The first and second liquid crystal capacitors Clch and Clcl can be formed by overlapping the first and second subpixel electrodes 191h and 191l connected to the first and second switching elements Qh and Ql and the common electrode 270 of the upper panel 200 to each other. The first and second storage capacitors Csth and Cstl can be formed by overlapping the storage electrode line 125, the storage electrode 129 and the first and second subpixel electrodes 191h and 191l.

The down capacitor Cstd can be connected to the output terminal of the third thin film transistor Qc and the storage electrode line 125, and the storage electrode line 125 can be provided in the lower panel 100 and the output terminal of the third thin film transistor Qc overlapping each other via the insulator.

In some examples, if the gate line 121 is applied with the gate-on voltage Von, the first and second thin film transistors Qh and Ql can be turned on.

For example, the data voltage applied to the data line 171 may equally be applied to the first and second subpixel electrodes 191h and 191l through the turned-on first and second switching elements Qh and Ql. The first and second liquid crystal capacitors Clch and Clcl can be charged by a difference between the common voltage Vcom of the common electrode 270 and the voltage of the first and second subpixel electrodes 191h and 191l such that the charging voltage of the first liquid crystal capacitor Clch can be the same value as the charging voltage of the second liquid crystal capacitor Clcl. In this example, the down gate line 123 can be applied with the gate-off voltage Voff.

In some examples, as similar to the gate line 121 is applied with the gate-off voltage Voff, if the down gate line 123 is applied with the gate-on voltage Von, the first and second switching elements Qh and Ql connected to the gate line 121 can be turned off, and the third switching element Qc can be turned on. Accordingly, charges of the second subpixel electrode 191l connected to the output terminal of the second switching element Ql can flow into the down capacitor Cstd such that the voltage of the second liquid crystal capacitor Clcl can be decreased.

In some examples, if the liquid crystal display according to exemplary embodiments of the present invention can be driven by frame inversion, and if the data line 171 is applied with a positive data voltage with respect to the common voltage Vcom in the present frame, negative charges can be gathered in the down capacitor Cstd after the process of a previous frame is finished. In the present frame, if the third switching element Qc is turned on, the positive charges of the second subpixel electrode 191l can flow into the down capacitor Cstd through the third switching element Qc such that positive charges can be gathered in the down capacitor Cstd and the voltage of the second liquid crystal capacitor Clcl can be decreased. In the next frame, for example, the third switching element Qc is turned on in a state that negative charges are charged in the second subpixel electrode 191l, the negative charges of the second subpixel electrode 191l can flow into the down capacitor Cstd such that negative charges can be gathered in the down capacitor Cstd, and the voltage of the second liquid crystal capacitor Clcl can be decreased.

It should be understood that the charging voltage of the second liquid crystal capacitor Clcl may lower than the charging voltage of the first liquid crystal capacitor Clch regardless of the polarity of the data voltage. Accordingly, the charging voltages of the first and is second liquid crystal capacitors Clch and Clcl may be different from each other, such that the lateral view of the liquid crystal display may be improved.

In some examples, the first and second switching elements Qh and Ql of the first and second subpixel electrodes 191h and 191l may be applied with different data voltages obtained from one image information through different data lines, or at different times. In this example, the third switching element Qc and the down capacitor Cstd may be omitted by way of configuration of manufacturing process.

Next, a liquid crystal panel assembly according to exemplary embodiments of the present invention will be described with reference to FIG. 7 and FIG. 8. The same constituent elements as of the previous exemplary embodiment are indicated by the same reference numerals, and the same description may be omitted to avoid unnecessarily obscuring the present invention.

Figure 7:
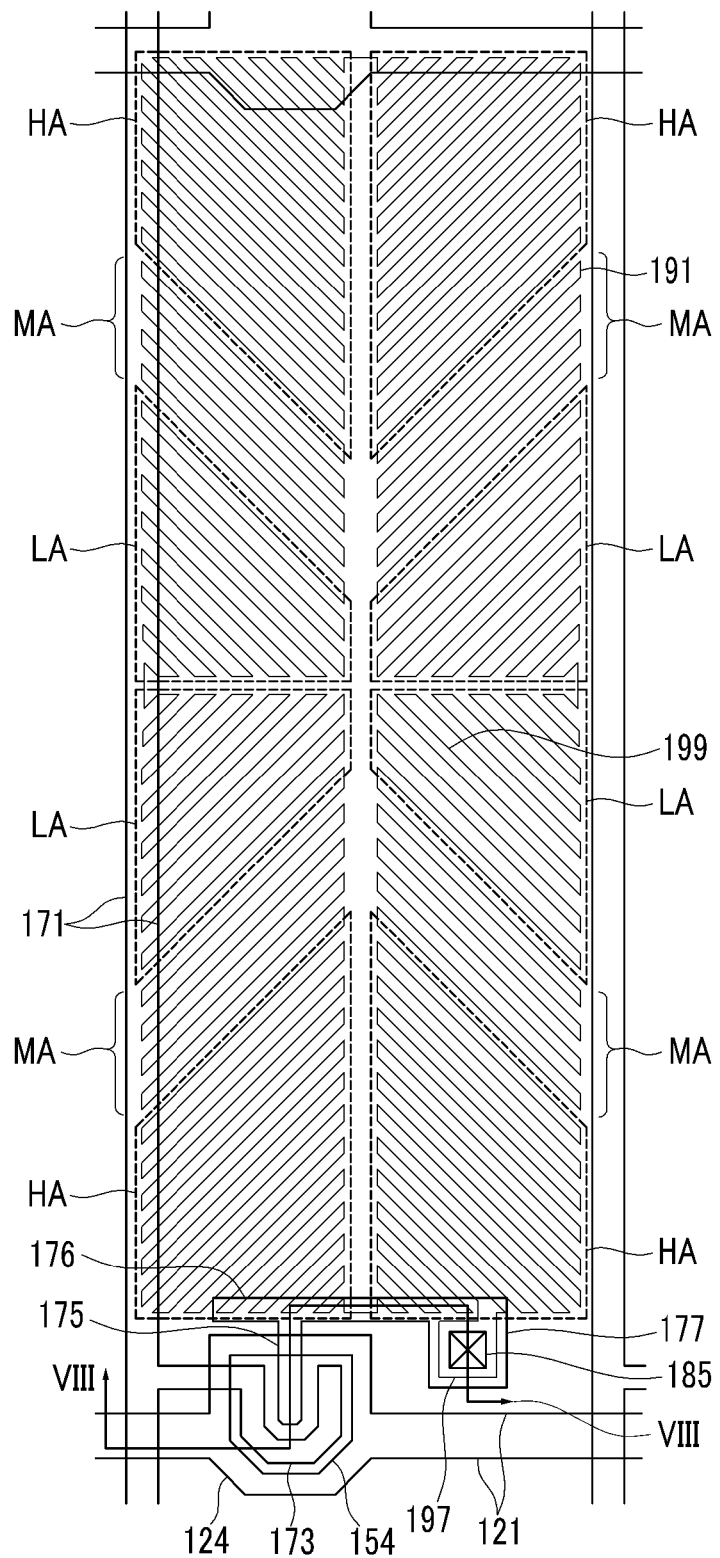
FIG. 7 is a layout view of a liquid crystal panel assembly, according to exemplary embodiments of the present invention.
Figure 8:
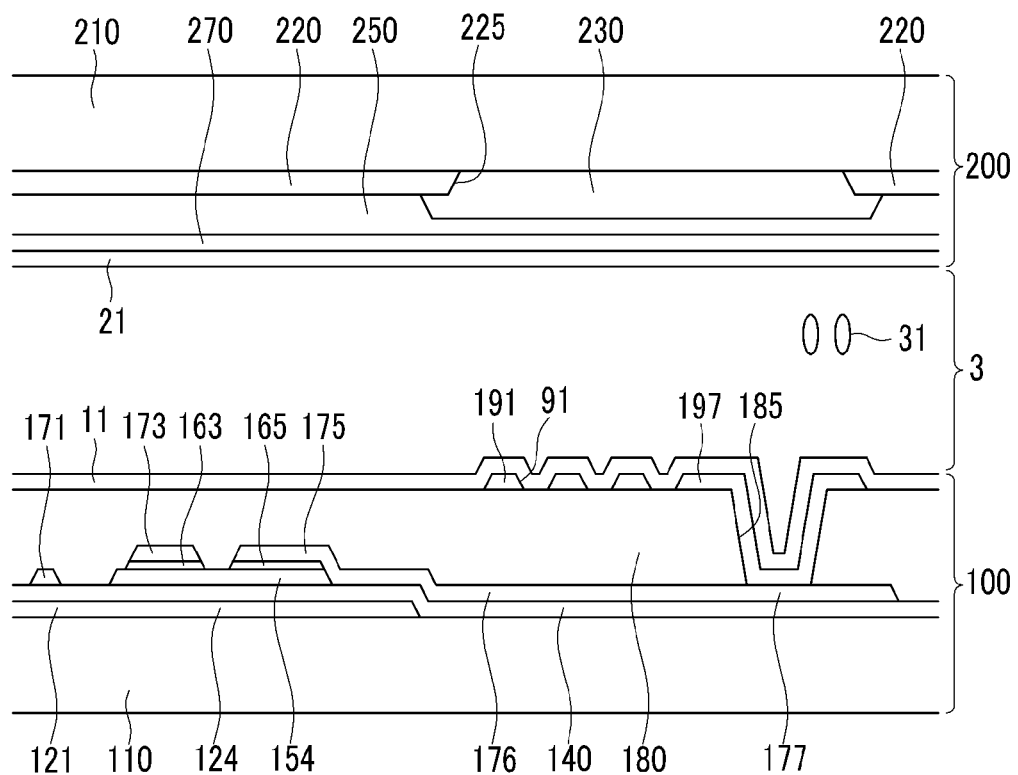
FIG. 8 is a cross-sectional view of the liquid crystal panel assembly of FIG. 7 taken along the line VIII-VIII.

FIG. 7 is a layout view of a liquid crystal panel assembly, according to exemplary embodiments of the present invention, and FIG. 8 is a cross-sectional view of the liquid crystal panel assembly of FIG. 7 taken along the line VIII-VIII.

Referring to FIG. 7 and FIG. 8, a liquid crystal panel assembly according to exemplary embodiments of the present invention may include a lower panel 100 and an upper panel 200 facing each other, and a liquid crystal layer 3 interposed between two display panels 100 and 200.

Firstly, the lower panel 100 will be described.

As shown in FIG. 8, for example, a plurality of gate lines 121 including a plurality of gate electrodes 124 protruding upward can be formed on an insulation substrate 110, and a gate insulating layer 140 can be formed thereon. A plurality of semiconductor islands 154 can is be formed on the gate insulating layer 140.

A plurality of pairs of ohmic contact islands 163 and 165 can be formed on the semiconductors 154, and a plurality of data lines 171 and a plurality of drain electrodes 175 can be formed on the ohmic contact islands 163 and 165 and the gate insulating layer 140. Each data line 171 including a plurality of source electrodes 173 can be extended toward the gate electrodes 124 and curved with a "U" shape.

The drain electrode 175 may include a longitudinal portion, a transverse portion 176, and an expansion 177. The longitudinal portion may face the source electrode 173 with respect to the gate electrode 124. The transverse portion 176 may intersect the longitudinal portion in the vertical direction and can be extended in the transverse direction and parallel to the gate line 121. The expansion 177 can be disposed on one end of the transverse portion 176 and may have a wide area for contacting with another layer.

A passivation layer 180 can be formed on the data line 171, the drain electrode 175, and the exposed semiconductor 154. The passivation layer 180 may have a plurality of contact holes 185 exposing to the expansion 177 of the drain electrode 175.

A plurality of pixel electrodes 191 can be formed on the passivation layer 180. The shape of the pixel electrode 191 may similar to the shape of the first subpixel electrode 191h or the second subpixel electrode 191l that are described above. The lower protrusion 197 of the pixel electrode 191 can be connected to the drain electrode 175 through the contact hole 185 thereby receiving the data voltage from the drain electrode 175.

An alignment layer 11 may be formed on the pixel electrode 191.

Next, referring to the upper panel 200, a light blocking member 220 can be formed on a substrate 210. The light blocking member 220 may prevent light leakage generated between the pixel electrodes 191, and may include a plurality of openings 225 defining the regions facing the pixel electrodes 191.

A plurality of color filters 230 can be formed on the substrate 210 and the light blocking member 220. Most of the color filters 230 may be disposed in the regions enclosed by the light blocking members 220, and may be extended according to the column of the pixel electrodes 191. In some examples, the color filter 230 may be disposed in the lower panel 100.

An overcoat 250 can be formed on the color filters 230 and the light blocking member 220, and a common electrode 270 may preferably be made of a transparent conductor such as ITO or IZO that is formed on the whole surface of the overcoat 250. An alignment layer 21 can be formed on the common electrode 270.

The two alignment layers 11 and 21 may be vertical alignment layers.

The pixel electrode 191 can be applied with the data voltage from the data line 171, and generates the electric field to the liquid crystal layer 3 along with the common electrode 270 applied with the common voltage. Thus, liquid crystal molecules 31 of the liquid crystal layer 3 can change directions so that the major axes thereof may become perpendicular to the direction of the electric field in response to the electric field.

The pixel electrode 191 may include four subregions divided by the minute slits 91 extending in different directions, and the inclined directions of the liquid crystal molecules 30, opposing to the pixel electrode 191, are all four directions due to minute slits 91. Each subregion may include a first region HA having a relatively small pitch of the minute branches 199 or the minute slits 91, a second region having a relatively large pitch of the minute branches 199 or the minute slits 91, and a third region MA where the pitch of the minute branches 199 or the pitch of the minute slits 91 may gradually be changed. The minute branches 199 and the minute slits 91 of the pixel electrode 191 may be applied with the various characteristics and may effects for the minute branches and minute slits of the second subpixel electrode 191*l* of the above-described exemplary embodiments.

Next, a liquid crystal panel assembly according to exemplary embodiments of the present invention will be described with reference to FIG. 9, FIG. 10, and FIG. 11. The same constituent elements as of the previous exemplary embodiment are indicated by the same reference numerals, and the same description may be omitted to avoid unnecessarily obscuring the present invention.

Figure 9:
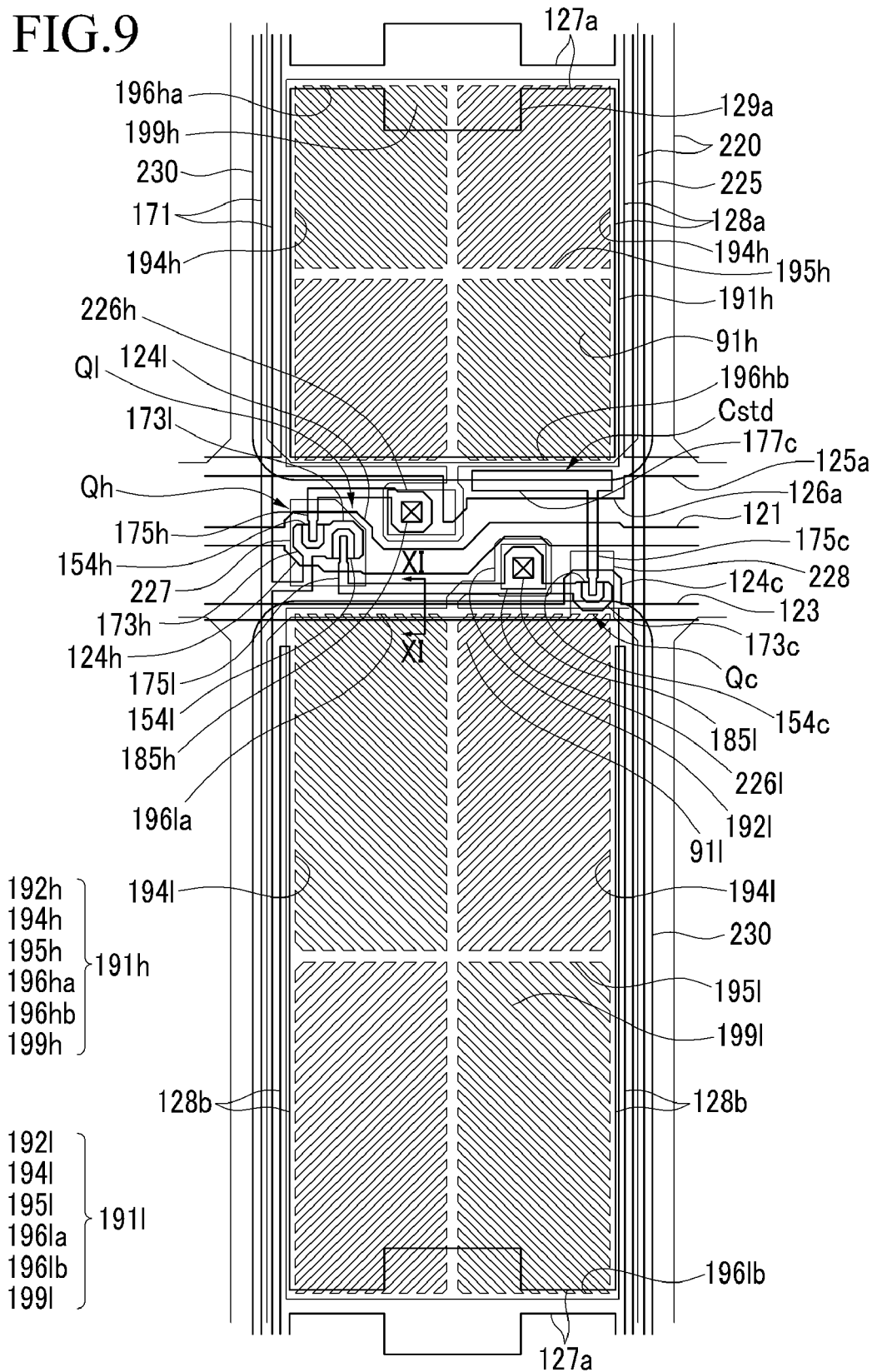
FIG. 9 is a layout view of a liquid crystal panel assembly, according to exemplary embodiments of the present invention.
Figure 10:
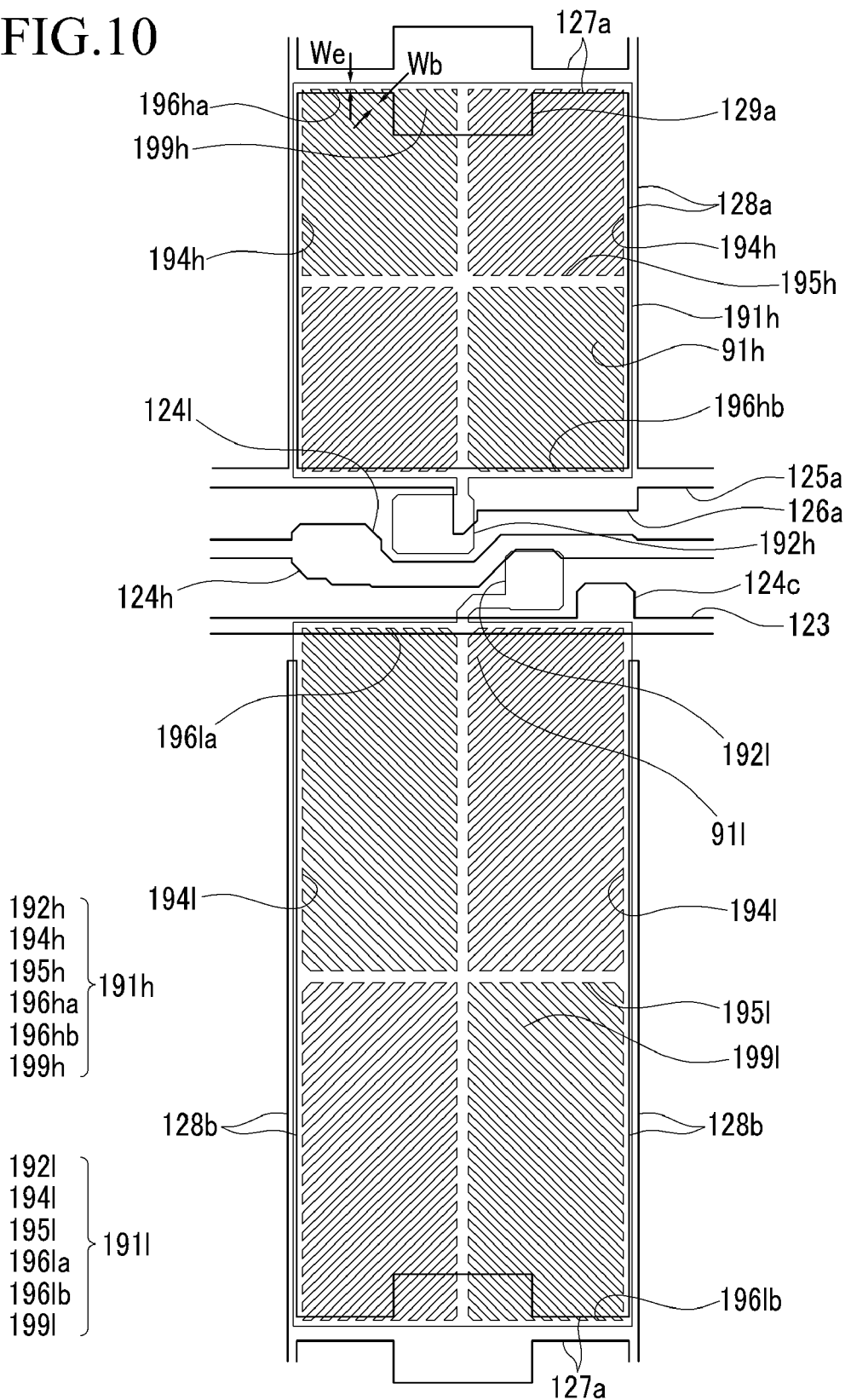
FIG. 10 is a layout view of a pixel electrode and a gate conductor of a liquid crystal panel assembly of FIG. 9.
Figure 11:
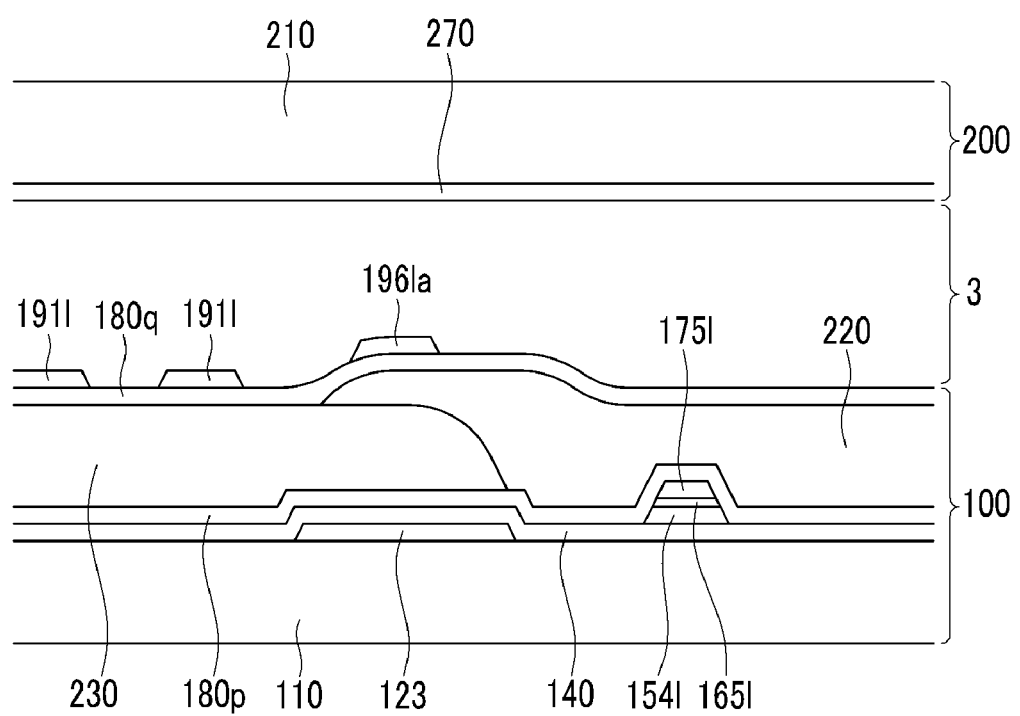
FIG. 11 is a cross-sectional view of the liquid crystal panel assembly of FIG. 9 taken along the line XI-XI.

FIG. 9 is a layout view of a liquid crystal panel assembly according to exemplary embodiments of the present invention, FIG. 10 is a layout view of a pixel electrode and a gate conductor of a liquid crystal panel assembly of FIG. 9, and FIG. 11 is a cross-sectional view of the liquid crystal panel assembly of FIG. 9 taken along the line XI-XI.

Referring to FIG. 9, FIG. 10, and FIG. 11, a liquid crystal panel assembly according to exemplary embodiments of the present invention is similar to as the liquid crystal panel assembly shown in FIG. 3, FIG. 4, and FIG. 5 such that different illustration points from the liquid crystal panel assembly shown in FIG. 3, FIG. 4, and FIG. 5 will be mainly described.

For example, a common electrode 270 can be formed on an insulation substrate 210 consisting of an upper panel 200, and a liquid crystal layer 3 can be formed between the lower panel 100 and the upper panel 200.

In referring to the lower panel 100, a plurality of gate conductors including a plurality of gate lines 121, a plurality of down gate lines 123, and a plurality of storage electrode lines 125*a* may be formed an insulation substrate 110.

In some example, the storage electrode line 125*a* may be disposed directly on the gate line 121 and may be extended mainly in the horizontal direction, and may transmit a predetermined voltage such as the common voltage Vcom. The storage electrode line 125*a* may include a storage expansion 126*a* expanded downward, a pair of first longitudinal portions 128*a* expanded upward and approximately vertical to the gate line 121, a transverse portion 127*a* connecting the ends of the pair of the first longitudinal portions 128*a* to each other, a storage electrode 129*a* of which the portion of the transverse portion 127*a* can be expanded up and down, and a pair of second longitudinal portions 128*b* can be extended from the end of the first longitudinal portions 128*a*.

A gate insulating layer 140 may be formed on the gate conductors 121, 123, and 125*a*.

A plurality of semiconductor stripes (not shown) may be formed on the gate insulating layer 140, and a plurality of ohmic contact stripes (not shown) may be formed thereon. The semiconductor stripes may include the first and second semiconductors 154*h* and 154*l* and the third semiconductor 154*c* connected to the second semiconductor 154*l*. A second ohmic contact 165*l* may be formed on the second semiconductor 154*l*.

A data conductor including a plurality of data lines 171, a plurality of first drain electrodes 175*h*, a plurality of second drain electrodes 175*l*, and a plurality of third drain electrodes 175*c* can be formed on the ohmic contact 165*l*.

A lower passivation layer 180*p* may be formed on the data conductors 171, 175*h*, 175*l*, and 175*c*, and the exposed semiconductors 154*h*, 154*l*, and 154*c*, and a color filter 230 and a light blocking member 220 may be formed thereon. The light blocking member 220 may include openings 226*h*, 226*l*, 227 and 228.

An upper passivation layer 180*q* may be formed on the color filter 230 and the light blocking member 220.

In some examples, at least one of the color filter 230 and the light blocking member 220 may be formed in the upper panel 200, and the upper passivation layer 180*q* may be omitted by way of configuration according to manufacturing process. When at least one of the color filter 230 and the light blocking member 220 is formed in the upper panel 200, an upper passivation layer (not shown) made of an organic material can be formed on the lower passivation layer 180*p*, or an organic layer (not shown) may be formed instead of the lower passivation layer 180*p*.

A pixel electrode including the first subpixel electrode 191*h* and the second subpixel electrode 191*l* is formed on the upper passivation layer 180*q*.

The first subpixel electrode 191*h* may include a cross stem 195*h*, an upper transverse connection 196*ha*, a lower transverse connection 196*hb*, left and right longitudinal connections 194*h* connecting the upper transverse connection 196*ha* and the lower transverse connection 196*hb*, and a protrusion 192*h* protruding downward from the lower portion of the longitudinal stem of the cross stem 195*h*. The upper transverse connection 196*ha*, the lower transverse connection 196*hb*, and the left and right longitudinal connections 194*h* may form together the periphery of the first subpixel electrode 191*h*.

The entire shape of the second subpixel electrode 191*l* may similar to the first subpixel electrode 191*h*. The second subpixel electrode 191*l* may include a cross stem 195*l*, an upper transverse connection 196*la*, a lower transverse connection 196*lb*, left and right longitudinal connections 194*l* connecting the upper transverse connection 196*la* and the lower transverse connection 196*lb*, and a protrusion 192*l* protruded upward from the upper portion of the longitudinal stem of the cross stem 195*l*. The upper transverse connection 196*la*, the lower transverse connection 196*lb*, and the left and right longitudinal connections 194*l* may form together an outer edge of the second subpixel electrode 191*l*.

In some examples, the first subpixel electrode 191*h* and the second subpixel electrode 191*l* can be divided into four subregions by the cross stems 195*h* and 195*l*, and the outer edge, and each subregion may include a plurality of minute branches 199*h* and 199*l* and minute slits 91*h* and 91*l* obliquely extending outside from cross stems 195*h* and 195*l*. The ends of the plurality of minute branches 199*h* and 199*l* can be connected with the outer edge.

The width We of the upper transverse connections 196*ha* and 196*la*, the lower transverse connections 196*hb* and 196*lb*, and the left and right longitudinal connections 194*h* and 194*l* forming the outer edge of the first subpixel electrode 191*h* and the second subpixel electrode 191*l* may be less than about 2.5 times of the width Wb of the minute branches 199*h* and 199*l* of the first subpixel electrode 191*h* and the second subpixel electrode 191*l*. For example, the interval between the minute branches 199*l* and the width of the minute slits 91*l* in each subregion of the second subpixel electrode 191*l* may not be changed according to positions, but the interval may be uniform.

The upper transverse connection 196*ha* of the first subpixel electrode 191*h* may substantially overlap the transverse portion 127*a* of the storage electrode line 125*a* in a width direction of the storage electrode line 125*a*, such that the upper transverse connection 196*ha* can be disposed inside of the outer edge of the transverse portion 127*a* of the storage electrode line 125*a*, and the lower transverse connection 196*hb* may substantially overlap the storage electrode line 125*a* in a width direction of the storage electrode line 125*a*, such that the lower transverse connection 196*hb* can be disposed inside of the outer edge of the storage electrode line 125*a*. In some examples, the lower transverse connection 196*lb* of the second subpixel electrode 191*l* may substantially overlap the transverse portion 127a of the storage electrode line 125a in a width direction of the storage electrode line 125a, such that the lower transverse connection 196lb can be disposed inside of the outer edge of the transverse portion 127a of the storage electrode line 125a. However, the upper transverse connection 196ha and lower transverse connection 196hb of the first subpixel electrode 191h and the lower transverse connection 196lb of the second subpixel electrode 191l may partially overlap the storage electrode line 125a or the transverse portion 127a of the storage electrode line 125a.

The left and right longitudinal connections 194h of the first subpixel electrode 191h may partially overlap the pair of first longitudinal portions 128a of the storage electrode line 125a, and the left and right longitudinal connections 194l of the second subpixel electrode 191l may partially overlap the pair of second longitudinal portions 128b of the storage electrode line 125a. However, the left and right longitudinal connections 194h of the first subpixel electrode 191h and the left and right longitudinal connections 194l of the second subpixel electrode 191l may substantially overlap the pair of first longitudinal portions 128a and the pair of second longitudinal portions 128b of the storage electrode line 125a in a width direction of the storage electrode line 125a.

The upper transverse connection 196la of the second subpixel electrode 191l may substantially overlap the down gate line 123 in a width direction of the down gate line 123, and thereby the upper transverse connection 196la can be disposed inside of the outer edge of the down gate line 123.

As described above, one of the upper transverse connections 196ha and 196la, the lower transverse connections 196hb and 196lb, and the left and right longitudinal connections 194h and 194l of the first and second subpixel electrodes 191h and 191l at least may overlap the storage electrode line 125a and the down gate line 123 can be formed, and the width thereof may less than about 2.5 times that of the each minute branches 199h and 199l, such that texture may be reduced at the edge region of the first and second subpixel electrodes 191h and 191l.

Also, in the liquid crystal panel assembly shown in FIG. 7 and FIG. 8, the pixel electrode 191 may further include a transverse connection (not shown) and a longitudinal connection (not shown) connecting the ends of the minute branches 199 of the pixel electrode 191, and this transverse connection or this longitudinal connection may partially or completely overlap the gate line 121 or the storage electrode line (not shown) transmitting the common voltage thereby reducing the texture. Also, the width of the transverse connection or the longitudinal connection may be less than about 2.5 times of the width of the minute branches 199. The present invention improves luminance of a liquid crystal display including a field generating electrode of a plurality of minute slits.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

A liquid crystal display according to exemplary embodiments of the present invention includes a first substrate and a pixel electrode formed on the first substrate and including a plurality of minute branches. The pixel electrode may include a first region where an interval between neighboring minute branches may be a first distance, a second region where an interval between neighboring minute branches may be a second distance that may larger than the first distance, and a third region positioned between the first region and the second region and having an interval between neighboring minute branches that may gradually be changed.

A pitch of the minute branches of the first region may be a first pitch, a pitch of the minute branches of the second region may be a second pitch, and the first pitch may be less than the second pitch.

A width of the minute branches in the first region, the second region, and the third region may be uniform.

The width of the minute branches may be in a range of 3.5 µm to 4.5 µm.

The first region may have a larger area than the second region.

The first region may occupy about 60-70% of an area of the pixel electrode.

The third region may occupy about 15-25% of an area of the pixel electrode.

The first distance may be in a range of 2.5 µm to 3.5 µm, and the second distance may be in a range of 3.5 µm to 4.5 µm.

The interval between the minute branches of the third region may be gradually changed by 0.2 µm to 0.3 µm.

The first distance may be in a range of 2.5 µm to 3.5 µm, and the second distance may be in a range of 4.5 µm to 5.5 µm.

The pixel electrode may be divided into a plurality of subregions having the minute branches extending in different length directions, and each subregion may include the first region, the second region, and the third region.

The pixel electrode may include a first subpixel electrode and a second subpixel electrode that may be separated from each other, and a voltage of the first subpixel electrode and a voltage of the second subpixel electrode may be different from each other.

Each of the first subpixel electrode and the second subpixel electrode may include a plurality of minute branches, and the second subpixel electrode may include the first region, the second region, and the third region.

The first subpixel electrode and the second subpixel electrode may receive different data voltages from each other obtained from one image information.

A data line and a gate line formed on the first substrate may by further included, wherein the first subpixel electrode may be connected to the data line and the gate line through the first switching element, the second subpixel electrode may be connected to the data line and the gate line through the second switching element, and the second subpixel electrode may be connected to the down capacitor through the third switching element.

A second substrate facing the first substrate, and a common electrode applied with a common voltage on the second substrate may be further included.

The pixel electrode may further include a connection connecting ends of the plurality of minute branches.

A width of the connection may be less than about 2.5 times a width of the minute branches.

A data line and a gate line may be formed on the first substrate and connected to the pixel electrode through the switching element may be further included, and at least a portion of the connection may overlap at least a portion of the gate line.

The portion of the connection overlapping the at least a portion of the gate line may substantially overlap the at least a portion of the gate line in a width direction of the gate line.

A storage electrode line formed on the first substrate, and transmitting a common voltage may be further included, and at least a portion of the connection may overlap at least a portion of the storage electrode line.

A color filter disposed on the first substrate may be further comprised.

A light blocking member disposed on the first substrate may be further comprised.

A second substrate facing the first substrate may be further comprised, and a spacer for maintaining a gap between the first substrate and the second substrate may be further disposed on the first substrate.

According to exemplary embodiments of the present invention, the region where the interval between the minute branches may gradually be changed and may be disposed between two regions having the different intervals between the minute branches or the different widths of the slits in the second subpixel electrode such that the texture may be minimized, thereby increasing transmittance.

Also, in each subregion of the second subpixel electrode, the area of the region where the interval between the minute branches is narrow that may larger than that of the region where the interval between the minute branches is large such that the luminance may be improved.

Also, the width of the connection connecting the ends of the minute branches may be defined in each pixel electrode or subpixel electrode, and it may overlap the gate line or the storage electrode line such that the texture may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate; and
   a pixel electrode, comprising a plurality of minute branches, formed on the substrate,
   wherein the pixel electrode comprises a first region, a second region, and a third region, the third region being between the first region and the second region,
   wherein each of the first region, the second region, and the third region has at least three minute branches,
   wherein intervals between the respective neighboring minute branches of the first region have a first distance throughout the first region, and intervals between the respective neighboring minute branches of the second region have a second distance throughout the second region, the second distance being larger than the first distance, and
   wherein intervals between the respective neighboring minute branches of the third region have a varying distance.

2. The liquid crystal display of claim 1, wherein a pitch of the minute branches of the first region is a first pitch, a pitch of the minute branches of the second region is a second pitch, wherein the first pitch is less than the second pitch.

3. The liquid crystal display of claim 1, wherein the first distance is in a range of approximately 3.5 μm to approximately 4.5 μm, and the second distance is in a range of approximately 3.5 μm to approximately 4.5 μm.

4. The liquid crystal display of claim 1, wherein the first region has a larger area than that of the second region.

5. The liquid crystal display of claim 1, wherein the first region, the second region, and the third region form a subregion of the pixel electrode, and the first region occupies about 60-70% of an area of the subregion.

6. The liquid crystal display of claim 4, wherein the first region, the second region, and the third region form a subregion of the pixel electrode, and the third region occupies about 15-25% of an area of the subregion.

7. The liquid crystal display of claim 1, wherein the first distance is in a range of approximately 2.5 μm to approximately 3.5 μm, and the second distance is in a range of approximately 3.5 μm to approximately 4.5 μm.

8. The liquid crystal display of claim 7, wherein the interval between the minute branches of the third region is gradually changed by approximately 0.2 μm to approximately 0.3 μm.

9. The liquid crystal display of claim 1, wherein the first distance is in a range of approximately 2.5 μm to approximately 3.5 μm, and the second distance is in a range of approximately 4.5 μm to approximately 5.5 μm.

10. The liquid crystal display of claim 9, wherein the interval between the minute branches of the third region is gradually changed by approximately 0.2 μm to approximately 0.3 μm.

11. The liquid crystal display of claim 1, wherein the width of each of the plurality minute branches is in a range of approximately 3.5 μm to approximately 4.5 μm.

12. The liquid crystal display of claim 1, wherein the pixel electrode is divided into a plurality of subregions, each subregion having minute branches extending in different length directions, respectively, and each subregion comprises the first region, the second region, and the third region.

13. The liquid crystal display of claim 1, wherein the pixel electrode comprises a first subpixel electrode and a second subpixel electrode that are separated from each other, and
the first subpixel electrode and the second subpixel electrode are configured to have different voltages from each other.

14. The liquid crystal display of claim 13, wherein each of the first subpixel electrode and the second subpixel electrode comprises a plurality of minute branches, and
the second subpixel electrode comprises the first region, the second region, and the third region.

15. The liquid crystal display of claim 13, wherein the first subpixel electrode and the second subpixel electrode are configured to receive different voltage data from each other obtained from one image information.

16. The liquid crystal display of claim 13, further comprising:
   a data line and a gate line formed on the substrate,
   wherein the first subpixel electrode is connected to the data line and the gate line via a first switching element;
   the second subpixel electrode is connected to the data line and the gate line via a second switching element; and
   the second subpixel electrode is connected to a down capacitor via a third switching element.

17. The liquid crystal display of claim 1, further comprising:
   a second substrate facing the substrate, and a common electrode disposed on the second substrate, the common electrode being configured to receive a common voltage.

18. The liquid crystal display of claim 1, wherein the pixel electrode further comprises a connection connecting ends of the plurality of minute branches.

19. The liquid crystal display of claim 18, wherein the width of the connection is less than about 2.5 times of a width of the minute branches.

20. The liquid crystal display of claim 19, further comprising:
 a data line and a gate line formed on the substrate and connected to the pixel electrode via a switching element,
 wherein at least a portion of the connection overlaps at least a portion of the gate line.

21. The liquid crystal display of claim 20, wherein the connection overlaps the gate line in a width direction of the gate line.

22. The liquid crystal display of claim 20, further comprising:
 a storage electrode line, formed on the substrate, to transmit a common voltage,
 wherein at least a portion of the connection overlaps at least a portion of the storage electrode line.

23. The liquid crystal display of claim 18, further comprising:
 a data line and a gate line formed on the substrate and connected to the pixel electrode via a switching element,
 wherein at least a portion of the connection overlaps at least a portion of the gate line.

24. The liquid crystal display of claim 23, wherein the connection overlaps the gate line in a width direction of the gate line.

25. The liquid crystal display of claim 23, further comprising:
 a storage electrode line, formed on the substrate, to transmit a common voltage,
 wherein at least a portion of the connection overlaps at least a portion of the storage electrode line.

26. The liquid crystal display of claim 18, further comprising:
 a storage electrode line, formed on the substrate, to transmit a common voltage,
 wherein at least a portion of the connection overlaps at least a portion of the storage electrode line.

27. The liquid crystal display of claim 1, further comprising:
 a color filter disposed on the substrate.

28. The liquid crystal display of claim 1, further comprising:
 a light blocking member disposed on the substrate.

29. The liquid crystal display of claim 1, further comprising:
 a second substrate facing the substrate; and
 a spacer provided to maintain a gap between the substrate and the second substrate disposed on the substrate.

30. A liquid crystal display, comprising:
 a substrate;
 a data line and a gate line formed on the substrate; and
 a pixel electrode, comprising a plurality of minute branches, formed on the substrate,
 wherein the pixel electrode comprises a first region and a second region in which a first distance and a second distance are provided according to an interval formed between the respective neighboring minute branches, wherein the second distance is larger than the first distance, and a third region is provided between the first region and the second region, and the third region having an interval between the neighboring minute branches that gradually changes, wherein the pixel electrode comprises a first subpixel electrode and a second subpixel electrode that are separated from each other, the first subpixel electrode and the second subpixel electrode are configured to have different voltages from each other, and wherein
 the first subpixel electrode is connected to the data line and the gate line via a first switching element,
 the second subpixel electrode is connected to the data line and the gate line via a second switching element, and
 the second subpixel electrode is connected to a down capacitor via a third switching element.

31. A liquid crystal display, comprising:
 a substrate; and
 a pixel electrode, comprising a plurality of branches, disposed on the substrate,
 wherein the pixel electrode comprises a first region, a second region, and a third region, each of the first region, the second region, and the third region having at least three minute branches,
 wherein intervals between the respective neighboring branches of the first region have a first distance throughout the first region, and
 wherein intervals between the respective neighboring branches of the third region have a varying distance.

32. The liquid crystal display of claim 31, wherein intervals between the respective neighboring branches of the second region have a second distance throughout the second region, the second distance being larger than the first distance.

* * * * *